Jan. 2, 1968            A. HALPERN ET AL          3,361,769
BI-METALLIC SALTS OF GLUCONIC, GLUCURONIC, OR
GALACTURONIC ACID
Filed Jan. 22, 1964
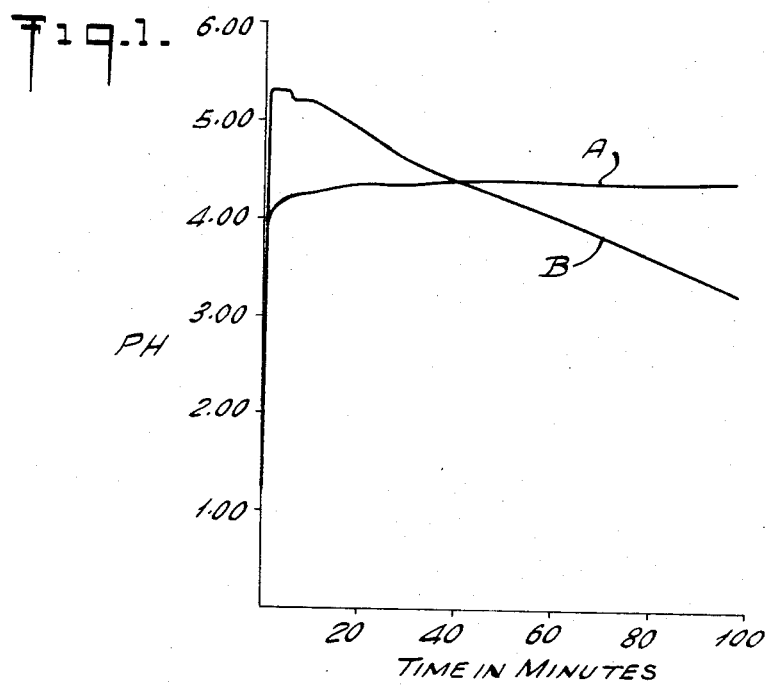
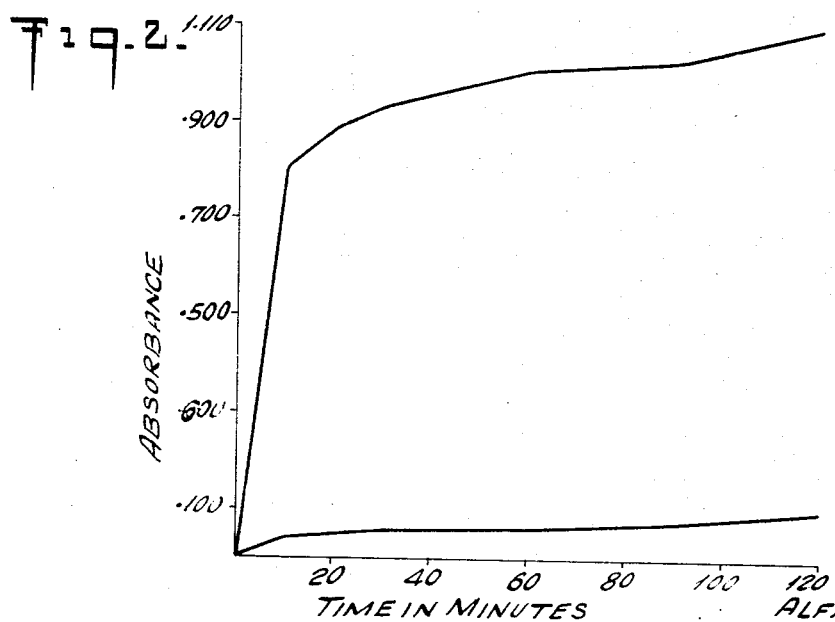
INVENTORS
ALFRED HALPERN &
ERNEST J. SASMOR
Stanley Wolder
ATTORNEY

United States Patent Office 3,361,769
Patented Jan. 2, 1968

3,361,769
BI-METALLIC SALTS OF GLUCONIC, GLUCURONIC, OR GALACTURONIC ACID
Alfred Halpern, Great Neck, and Ernest J. Sasmor, Yonkers, N.Y., assignors to Synergistics, Inc., New York, N.Y., a corporation of New York
Filed Jan. 22, 1964, Ser. No. 339,443
14 Claims. (Cl. 260—345.7)

The present invention relates to new and novel bi-metallo basic salts of certain aliphatic organic acids, which have desirable properties as ant-acid and anti-peptic substances, astringent agents and protein precipitants. In particular, the present invention is concerned with compounds of the class XALOH2R, wherein X may be the magnesium or calcium ion and R is either the gluconic, glucuronic or galacturonic acid radical, the process for the preparation of said compounds and the method of achieving the said antacid, anti-peptic, astringent and protein-precipitating effects.

Aluminum compounds have long been used as antacids in the therapy of peptic ulcer. The particular aluminum compounds which have been advocated for this usage are aluminum hydroxide gel, aluminum salts of amino acids, such as glycine, glutamic acid and lysine, aluminum salts of acylamino aliphatic mono and polycarboxylic acids and aluminum salts of organic acids such as gluconic acid. While these compounds serve to provide an acid-neutralizing action, these aluminum compounds have an inherent adverse physiologic effect in that they cause constipation, which interferes with the overall desired therapeutic action. The presence of gastrointestinal disease requiring the use of these medications mitigates against the superimposition of a gastrointestinal complication such as constipation, resulting from the administration of these compounds.

There have been many attempts to counteract this noxious property of the aluminum preparations. The recommendation to administer laxatives with the aluminum antacid components has been made but this is generally undesirable, because the degree of constipation resulting from the administration of these compounds varies with each individual and no fixed amount of laxative therapy will be adequate for all. Furthermore, the use of laxatives may be contraindicated in patients with certain gastrointestinal disease, especially those having a predisposition toward a hypermotility of the gastrointestinal tract, which would be aggravated after the administration of laxative agents.

Other attempts were concerned with the modification of the aluminum compounds as by the addition of magnesium salts, so that the constipating effect would be neutralized, by the magnesium ion hydrogogue action. The incorporation of the magnesium ion is achieved either through the simple addition of a magnesium compound, as for example, magnesium hydroxide or magnesium carbonate, in simple admixture with the aluminum preparation or by co-precipitation during manufacture, or by forming a magnesium derivative such as the double salt of magnesium and aluminum compound. An example of the latter group of compounds are the compounds described in United States Patent No. 2,907,781. These compounds which require vigorous conditions for reaction, result in a complex molecule containing a quadri-aluminum chemical compound. The method for the preparation of the magnesium aluminum complex salts, utilizes dimethylformamide as the solvent and the reaction is carried out under elevated temperatures. The use of a non-aqueous solvent and the vigorous conditions for synthesis is indicative of the chemical reaction conditions necessary to obtain these compounds. Furthermore, only a mono-acid derivative is obtained even under these vigorous conditions of synthesis. It is of interest to note that the compounds described in United States Patent No. 2,907,781, are all derivatives of amino acids and are insoluble in water.

Other attempts to prepare new aluminum-containing preparations which do not have the noxious properties of the conventional aluminum antacid compounds are described in United States Patent No. 3,099,524, in which magnesium carbinato-hydroxy aluminates are prepared, which have the formula:

$$Mg_n(AL_2(OH)_{5+2n}HCO_3)$$

wherein $n$ is an integer of 1 to 5. These compounds are distinguished in that they contain 2 aluminum atoms and from 7 to 15 hydroxyl radicals. The compounds are insoluble in water and contain appreciable quantities of bicarbonate ion.

Still another approach to the problem has been the preparation of the sodium salt of dihydroxy aluminum gluconate. This compound is of special interest in that it is described as a complex rather than a salt. The sodium complex of aluminum dihydroxy gluconate is described as being soluble in water, insoluble in ethanol and with a strongly alkaline pH of 8.5. Of major significance is the fact that the said complex sodium magnesium dihydroxy digluconate, does not precipitate protein, when it is added to a solution of casein indicating that it is devoid of astringent properties.

A significant limitation of the principal available aluminum antacid compounds resides in the fact that they are essentially insoluble in water and therefore have to be administered either as a suspension or a solid preparation. It is well known that substances which are not in solution do not enter into chemical reactions which depend upon an ionic mechanism. Thus, the aluminum hydroxide acid-neutralizing capacity depends upon a "leeching effect" of the hydrochloric acid upon the insoluble aluminum hydroxide to convert the compound into the soluble aluminum dihydroxy chloride. The essential mechanism for the neutralization of acids by the complex or double metallic salts, apparently consists of the conversion into a soluble intermediate prior to chemical acid-neutralization. Apart from the question of speed of reaction, which in this instance determines the rate of onset of the beneficial therapeutic effect, the problem of uniformity of dosage must be solved. Insoluble suspensions tend to sediment, a property which results in variable dosage administration and which is counteracted largely by the administration of excesses. These excessive quantities of the insoluble antacid preparation tend to aggravate the tendency toward constipation by the aluminum ion by setting up a rebound phenomenon. This rebound phenomenon may also extend to complications resulting from the over-alkalinization of the gastrointestinal contents especially when the more strongly alkaline preparations are utilized. There results a compensatory over-secretion of acid, which gives rise to the phenomenon known as rebound-acidosis. This is particularly apt to occur when compounds containing the sodium ion or the basic magnesium hydroxide and carbonates are used for acid neutralization.

In contrast to these properties of the older antacid aluminum compounds and the limitations of the various approaches of the aluminum antacid compounds, the products of the present invention are reproducible, homogeneous, chemical entities which are soluble in water, slightly soluble in ethanol, have no odor and only a faint taste. The new compounds are effective antacid preparations, neutralizing appreciable quantities of hydrochloric acid and inhibiting peptic activity. They are particularly advantageous in that they precipitate protein from solution so as to achieve a good astringent effect. The compounds of the present invention are capable of exerting a strong anti-perspirant-deodorant action and also to serve as mordants. The compounds are safe and non-toxic for therapeutic use and do not possess constipating properties, even after prolonged administration.

These new chemical compounds may be distinguished from the older preparations in that the magnesium is an integral part of the salt and is not incorporated as an admixture, which occurs in the co-precipitated magnesium aluminum hydroxy preparations. Furthermore, the new compounds are to be distinguished from the soluble complexes as, for example, sodium aluminum hydroxy gluconate, in that the magnesium atom is an integral part of the new molecule and is not present in the form of a complex or a chelated atom.

The subject compounds are approximately neutral in pH, said pH ranging from pH 6.5 to pH 7.5, for the 50 percent (w./v.) aqueous solutions, in contrast to that of the sodium and potassium aluminnum organic acid salts which are strongly alkaline at a pH of 8.5. The present compounds are soluble in water, whereas amino acid aluminum preparations and the basic aluminum hydroxy compounds are insoluble in water. The new compounds contain only one atom of aluminum and one atom of magnesium, together with two moieties of the organic acid, in contrast to the known double salts which contain at least 2 atoms of aluminum and at least seven hundred hydroxyl units.

The new compounds are non-constipating in contrast to the conventional aluminum acid salts, as for example, the aluminum gluconates. Although these new compounds possess strong protein-precipitating and astringent properties, they are singularly free of an astringent taste and do not affect the oral mucosa.

The compounds of the present invention are prepared by the reaction of an insoluble magnesium salt with the intermediate, aluminum monohydroxy di-acid salt, which intermediate is prepared through the interreaction between the organic acid and aluminum hydroxide, utilizing 2 mols of the acid moiety for each mol of aluminum hydroxide. An aqueous solution of the appropriate acid is added to the suspension of the freshly prepared aluminum hydroxide. Caution is to be exercised in the addition of the acid solution in that an excess of aluminum hydroxide is present during this step. As the addition of the organic acid solution reaches the last quantities, more rapid stirring is required. When all of the organic acid has been added, the mixture is warmed to reflux temperature for a period of 3 hours or until complete solution is achieved. The solution is then cooled and filtered and is ready for further synthesis. The aluminum monohydroxy di-acid salt may be isolated prior to further synthesis. When it is desired to isolate the salt then this may be readily accomplished by precipitating the compound with an alcohol, as for example, methanol, ethanol or isopropanol. In this manner aluminum hydroxy digluconate, aluminum hydroxy of diglucuronate, and aluminum hydroxy digalacturonate, may be prepared.

Aluminum hydroxide may be obtained commercially in either the gel or paste form or may be freshly prepared by any of the well known methods for its preparation. A convenient method, which results in a high degree of purity of colloidal aluminum hydroxide, is to utilize the aluminum alkoxides, as for example, aluminum isopropoxide and to hydrolyze this molecule to form aluminum hydroxide. The formed isopropyl alcohol is distilled.

To convert the intermediates into the desired magnesium salt it is necessary that a freshly prepared solution of the intermediate be reacted with an appropriate quantity of magnesium hydroxide either as a gel or as a paste. The freshly prepared solution of the intermediate may be obtained by dissolving the dried, isolated aluminum intermediate compound in a sufficient quantity of water, or utilizing the solution of the compound which results from synthesis. To a solution of the aluminum hydroxy di-acid salt is added an appropriate molar equivalent quantity of magnesium ion, preferably in the form of the oxide or hydroxide. Magnesium hydroxide paste is readily available commercially and may be conveniently utilized for this purpose. If it is desired to utilize magnesium carbonate, as the salt supplying the magnesium ion, then it is necessary that the solution be boiled to remove the liberated carbonic acid prior to the completion of the reaction.

In a similar manner the calcium double salt of the aluminum hydroxy di-acid may be obtained, utilizing appropriate molar quantities of such compounds as calcium oxide, calcium hydroxide or calcium carbonate and exercising the same cautions. The resultant magnesium aluminum hydroxy di-acid compound may be isolated if desired, although it is in a sufficient state of purity when in solution after synthesis to be utilized in therapy.

FIGURE I describes the antacid buffer capacity and the antacid neutralization rate of magnesium aluminum hydroxy digluconate, a representative member of this new class of compounds. Curve A of FIGURE I describes the antacid buffer capacity of the said compound, which was determined according to the method described in Hefferen, J. J., Schrotenboer, G., and Wolman, W., "An In Vitro Study of Antacids: Methods and Modifying Factors," which appeared in the Journal of the American Pharmaceutical Association, volume 45, page 564 (1956). The procedure utilized in the present study is as follows:

Artificial gastric juice was prepared, according to the specifications of the United States Pharmacopeia 16, and the pH of the artificial gastric fluid was determined to be pH 1.2 at 37° C., utilizing a pH meter, previously standardized with pH 4 buffer solution at 37° C. In a 400 ml. beaker fitted with a stirring device and an automatic pipette, was placed 50 cc. of the artificial gastric fluid. The beaker was warmed and maintained at a constant temperature of 37° C. in a waterbath. Five ml. of a 48 percent (w./v.) solution of the subject compound was rapidly introduced, the stirring started and the pH of the solution determined every minute for the first ten minutes and every five minutes for the next one hundred ten minutes, for a total time period of 2 hours. Every two minutes, 2 cc. of artificial gastric juice, previously warmed to a temperature of 37° C. was introduced into the system by means of an automatic pipette. The pH was determined immediately after the addition of the increment of artificial gastric juice and plotted as Curve A, of FIGURE I. It will be observed that the pH was maintained at approximately pH 4.2 and descended to pH 3.0 approximately 90 minutes after the start of the experiment. This graph confirms the excellent buffer capacity of the subject compound when utilized in a teaspoonful (5 cc.) doses.

Curve B of FIGURE I represents the acid neutralization rate of magnesium aluminum hydroxy digluconate, which was determined according to the well known procedure for this test. In this experiment 50 ml. of artificial gastric juice, prepared according to the directions of the United States Pharcacopeia 16, was placed in a 400 ml. beaker and the whole maintained at a temperature of 37° C. with a constant temperature bath. To this solution was added 5 ml. of a 48 percent (w./v.) solution of the subject compound. The mixture was stirred and the pH recorded at one minute intervals for the first ten minutes and at five minute intervals thereafter, until a constant pH was observed for three successive readings, after which time, the pH was determined at 10 minute intervals for the duration of the experiment, which was a period of 2 hours. It will be observed from an analysis of Curve B that a pH of between pH 4 and pH 4.4 was rapidly achieved within the first two minutes, after which time the curve was relatively constant throughout the experiment. This demonstrates a rapid acid neutralization rate for the subject compound, which is highly desirable to therapy and the said neutralization rate being maintained over a sustained period of time.

In determining the anti-peptic activity of new compounds, magnesium aluminum hydroxy digluconate was studied for its ability to inhibit pepsin activity in simulated gastric juice. The action of pepsin of an adsorbed protein-dye, for example, carmine fibrine, which was prepared as described in the British Pharmaceutical Codex, page 1174 (1959), was determined both before and after treatment with the subject compounds. A 10 percent (w./v.) concentration of magnesium aluminum hydroxy digluconate was dissolved with simulated gastric juice, prepared according to the United States Pharmacopeia 16 (page 1072) and the mixture stirred while maintained at a constant temperature of 37° C. At the end of each 10 minute period, a 20 ml. aliquote sample of the mixture was removed and to the solution was added a replacement portion of 20 ml. of fresh, simulated gastric fluid, prepared as above. The aliquote sample of the mixture containing the test compound was then studied for peptic activity by transferring it to a beaker which contained 1 gm. of the carmine-fibrine reagent, prepared as described above and this mixture incubated at 37° C. for 30 minutes and filtered. The filtrate was placed in a spectrophotometer and the absorbancy measured at 520 mu, using a filtered, simulated gastric fluid as a blank. This procedure was repeated at specified time intervals, using new samples and fresh quantities of carmine-fibrine.

To minimize possible error, 1 gram of carmine-fibrine was dispersed in 20 ml. of water, filtered and the absorbancy of the filtrate determined at 520 mu. This value was deducted from all readings at this wave length to eliminate the interfering absorbance due to presence of the free dye in the carmine-fibrine preparations.

FIGURE II demonstrates the anti-peptic activity of 15 gm. of magnesium aluminum hydroxy digluconate, in 150 ml. of artifical gastric fluid, prepared according to methods described in the United States Pharmacopeia 16. Curve A represents the absorbance value of this solution and demonstrates a high degree of anti-peptic activity. Curve B is the peptic activity of 150 ml. of artificial gastric fluid, which is presented as a control and also to demonstrate the high degree of anti-peptic activity provided by the subject compound.

When a solution of magnesium aluminum hydroxy digluconate, magnesium aluminum hydroxy diglucuronate, magnesium aluminum hydroxy digalacturonate, calcium aluminum hydroxy diglucuonate, calcium aluminum hydroxy diglucuronate, and calcium aluminum hydroxy digalacturonate are added to a standard solution of a protein, as for example, casein or albumin, an immediate and copious precipitate results, indicating a strong astringent effect. This action is singularly different from that observed after the same use of the sodium or potassium aluminum hydroxy digluconates under the same conditions.

Preparations of the test compounds are stable and may be stored in the conventional manner for prolonged periods of time, without change or discoloration. Because of the good aqueous solubility, there are no problems of caking or sedimentation as is observed with the insoluble compounds. The neutral pH mitigates against the adsorption of carbon dioxide to form carbonates, as would be observed in the more alkaline preparations. When these compounds are administered a prompt and effective antacid reaction is observed without the occurrence of constipation or other noxious effect.

The following examples illustrates the scope of the present invention:

*Example 1*

In a three-neck, glass reaction flask, equipped with a stirrer, condenser and funnel, is placed 400 ml. of distilled water and to this is added 204.23 gm. of freshly prepared aluminum isopropoxide. The mixture is stirred and warmed to about 80° C. for a period of 15 to 30 minutes and the isopropyl alcohol distilled. A solution of 392.2 gm. of gluconic acid, dissolved in 400 ml. of water, is added in small increments and the mixture refluxed for a period of at least 3 hours or until all suspended material is dissolved.

The solution is cooled, filtered and to the filtrate is added a suspension of 58.3 gm. of magnesium hydroxide in 250 ml. of water. The mixture is then refluxed for 2 hours or until complete solution is achieved and then cooled to room temperature. The solution is filtered, and the pH of the filtrate ranging from 6.5 to pH 7.5. The solvent is then removed by vacuum distillation at temperatures not exceeding 40° C. and the residue dried.

The dried residue is magnesium aluminum hydroxy digluconate, which is a white amorphous powder, without odor and possessing a very faint astringent taste. The empiric formula is $C_{12}H_{23}O_{15}AlMg$ and it has a molecular weight of 458.6 The compound begins to darken with decomposition at 220° C. to 225° C. Magnesium aluminum hydroxy digluconate is extremely soluble in water, slightly soluble in methanol and ethanol and insoluble in chloroform, ether and benzene. A 50 percent (w./v.) solution of magnesium aluminum hydroxy digluconate is approximately neutral in pH and gives positive identification tests for gluconic acid, magnesium and aluminum ions. One gram of magnesium aluminum hydroxy digluconate consumes not less than 60 ml. of tenth-normal hydrochloric acid.

*Example 2*

In a suitable reaction vessel is placed a solution of 356.3 gm. of glucono-delta-lactone dissolved in 750 ml. of distilled water. The mixture is heated to a temperature of 75° to 80° C. which is maintained for a period of three hours with continuous stirring. When the pH of the solution is between pH 1.3 and pH 1.75, the stirring is stopped and the solution allowed to cool to room temperature. The solution is filtered and to the filtrate is added 510 gm. of aluminum hydroxide gel, USP. The weight of aluminum hydroxide gel utilized is dependent upon the quantity of aluminum oxide contained in it. The aluminum hydroxide gel, USP, assays at 10 percent aluminum oxide and therefore, 510 gm. of aluminum hydroxide gel USP furnishes the necessary 27 gm. of aluminum ion. The aluminum hydroxide gel is added in small increments with constant stirring while the solution is heated to 80° C. The stirring is continued and the temperature is maintained for a period of 2 hours after the aluminum hydroxide gel has been added or until the solution becomes clear and the pH is between pH 3.3 and pH 3.4. The solution is cooled, filtered and to the filtrate is added in small increments, 24.3 gm. of magnesium ion in the form of magnesium hydroxide gel. Commercially available magnesium hydroxide gel may range in concentration of magnesium ion of from 10 to 15 gm. of magnesium ion per 100 gm. of gel, when assayed as magnesium oxide. Thus, if a magnesium hydroxide gel assaying at about 21 percent of magnesium oxide is utilized, then about 196 gm. of the gel would furnish the required 24.32 gm. of magnesium ion. When all of the magnesium hydroxide gel is introduced, the mixture is refluxed for a period of from 3 to 4 hours or until the solution becomes clear and the pH of the solution is between pH 6.5 and pH 7.5. When this pH has been reached, the solution may be clarified by the addition of 10 gm. of activated charcoal and 20 gm. of a filter aid, as for example, Celite–545. The mixture is stirred for a period of 10–15 minutes and filtered.

The filtrate is cooled to about 10° C. and to the filtrate is added 3 volumes of methanol, ith rapid stirring. Magnesium aluminum hydroxy digluconate precipitates and after standing for a short period, the supernatant liquid is decanted and the moist compound is spread on trays and air-dried. The air-dried material is then heated at temperatures not above 165–175° F. until no further loss in weight is observed. During the drying cycle, the compound may dissolve in the entrapped water, but it soon reverts to the solid state upon further drying. The dried powder is ground to a #60 mesh particle size or finer, and may be stored in suitable containers for further manufacturing use. An average yield of approximately 90 percent of the theoretical value is obtained by this method, without resorting to further purification procedures. The compound obtained is identical to that described in Example 1 above.

Example 3

To a solution containing 1 mol of aluminum hydroxy digluconate, dissolved in 1 liter of distilled water, is added 1 mol of powdered magnesium hydroxide. The mixture is stirred and refluxed for a period of 3 to 4 hours until the pH of the mixture is between pH 6.5 and pH 7.5. Caution is to be observed during the addition of magnesium hydroxide to the aluminum hydroxy digluconate solution in that magnesium hydroxide is evenly dispersed throughout the solution and that there always is an excess of aluminum hydroxy digluconate present during the addition step. When the last increments are to be added, good stirring is necessary, to maintain such a distribution. After the period of refluxing, the solution is clarified with activated charcoal and filtered. The filtrate may be used in further manufacturing of the individual dosage forms for therapeutic administration or for pharmaceutical usage, as a deodorant or anti-perspirant or for industrial purposes as a mordant or protein precipitant.

Should it be desired to isolate the magnesium aluminum hydroxy digluconate then the solvent of the filtrate is removed either by vacuum distillation or spray-drying and the residue recovered. The dried residue consists of magnesium aluminum hydroxy digluconate, which corresponds in physical and chemical properties to that compound described in Example 1 above.

Example 4

In a glass reaction vessel containing 0.1 mol of aluminum hydroxide, suspended in 250 ml. of distilled water, is added a solution of 0.2 mol of glucuronic acid, previously dissolved in 250 ml. of water. The mixture is warmed to about 70° C. and is stirred until all of the aluminum hydroxide has gone into solution. The solution is then cooled to room temperature and filtered. To the filtrate is added 0.1 mol of magnesium hydroxide suspended in 100 cc. of water and the mixture is warmed to a temperature not exceeding 50° C. and stirred until all the magnesium hydroxide has gone into solution. Caution should be exercised in the addition of the magnesium hydroxide in that a uniform distribution of the magnesium hydroxide is maintained and that an excess of aluminum glucuronate is present. When all of the magnesium hydroxide has dissolved, the solution is cooled and filtered. The filtrate is a solution of magnesium aluminum hydroxy diglucuronate and is approximately neutral in pH, having a range of pH of from pH 6.5 to pH 7.5, and is sufficiently pure for further pharmaceutical compounding or for cosmetic and pharmaceutical usage as an anti-perspirant-deodorant or for industrial uses as a mordant or protein precipitate.

When it is desired to isolate the magnesium aluminum hydroxy diglucuronate in the dry state, this may be accomplished by either evaporating the solvent under reduced pressure or by spray-drying and recovering the residue. The dried residue is a white to cream amorphous powder, without odor but having a faintly acid taste. The compound begins to darken, with decomposition, at 200° C. Magnesium aluminum hydroxy diglucuronate is soluble in water, slightly soluble in methanol and insoluble in chloroform and benzene. One gram of the compound neutralizes approximately 60 ml. of tenth-normal hydrochloric acid. Magnesium aluminum hydroxy diglucuronate has the empiric formula of $C_{12}H_{19}O_{15}AlMg$, and a molecular weight of 454.6.

Example 5

In a round-bottom reaction vessel is placed 1 mol of aluminum isopropoxide and 500 ml. of distilled water. The mixture is stirred and rapidly heated to 80° C., whereupon isopropyl alcohol is volatilized. After one-half hour of warming at temperatures of between 80° and 90° C., 2 mols of galacturonic acid is added to the mixture, in small increments, and the whole refluxed for a period of 3 hours. The mixture is filtered and to the filtrate is added 1 mol of magnesium hydroxide powder. The mixture is warmed to 50° C. until it is substantially clear and then cooled to room temperature and filtered. A filter-aid such as charcoal may be added, if desired. The resultant filtrate consists of a solution of magnesium aluminum hydroxy digalacturonate which is approximately neutral in pH. The dried powder may be recovered by evaporating the solvent and drying the residue. The dried magnesium aluminum hydroxy digalacturonate is a tan, amorphous powder, without odor and having a faint acid taste. One gram of this compound neutralizes at least 60 ml. of tenth-normal hydrochloric acid. The compound is soluble in water to the extent of 42 percent by weight, slightly soluble in ethanol and methanol and insoluble in ether, chloroform and benzene. The compound decomposes at 185–190° C. and has the empiric formula of $C_{12}H_{19}O_{15}AlMg$ and a molecular weight of 454.6.

Example 6

In place of the magnesium compound described in Examples 1 through 5, may be substituted in equivalent stoichiometric quantities, the calcium ion, as is present, for example, in equivalent quantities of calcium hydroxide, calcium oxide and calcium carbonate. The remainder of the steps being the same and the respective calcium aluminum hydroxy digluconate, calcium aluminum hydroxy digalacturonate and calcium aluminum hydroxy diglucuronate, is obtained.

Example 7

When it is desired to utilize either magnesium aluminum hydroxy digluconate, magnesium aluminum hydroxy diglucuronate, magnesium aluminum hydroxy digalacturonate, calcium aluminum hydroxy digluconate, calcium aluminum hydroxy diglucuronate and calcium aluminum hydroxy digalacturonate in therapy, for the purpose of achieving an antacid effect, then these may be prescribed in the form of a liquid preparation, tablet, capsule, granule or powder.

When a liquid preparation is preferred, then an appropriate quantity of the selected active material, as for example, magnesium aluminum hydroxy digluconate, magnesium aluminum hydroxy diglucuronate, magnesium aluminum hydroxy digalacturonate, calcium aluminum hydroxy digluconate, calcium aluminum hydroxy diglucuronate, and calcium aluminum hydroxy digalacturonate, is dissolved in distilled water to provide a concentration of 400 mg. of the selected active ingredient per 5 cc. of solution. The solution of the active material may be facilitated by the use of gentle heat, although it is preferred not to exceed 50° C. The solution is filtered and suitable flavoring and coloring materials may be added, if desired. The range in unit dosage concentration of the active ingredient is from 200 to 600 mg. per 5 cc. of solution, which may be administered from 1 to 10 times daily, depending upon the individual patient's requirements.

When a solid preparation is preferred, then either a tablet, capsule, granule or powder may be utilized. The range in concentration in active ingredient in each of the solid dosage form unit is between 200 and 600 mg. per unit dose with 400 mg. of the active ingredient an optimal amount. The individual unit dose may be administered from one to ten times daily, depending upon the patient's needs.

In the preparation of tablets, an appropriate quantity of the selected active material, as for example, magnesium aluminum hydroxy digluconate, magnesium aluminum hydroxy digluconate, magnesium aluminum hydroxy digalacturonate, calcium aluminum hydroxy digluconate, calcium aluminum hydroxy digluconate, is mixed with a pharmaceutically acceptable diluent, such as lactose, sucrose, starch or mannitol, so that the ratio of active compound to diluent is from one part active compound to one-third part diluent and one part active compound to three parts diluent. The mixture is granulated through a number 20 mesh sieve, utilizing a suitable granulating solution, such as 0.1 percent gelatin solution or 0.1 percent acacia solution and air-dried. To this dried mixture is then added suitable tablet lubricant, such as magnesium stearate, in concentrations of from 0.1 to 0.5 percent and the whole re-granulated, utilizing a 50 percent ethanol-water mixture. The wet mass is passed through a number 40 mesh sieve and air-dried. The granules are then tableted by compression, utilizing a suitably shaped mold. The size of the tablets are such as to provide a single tablet containing from 200 to 600 mg. of active ingredient, per tablet.

Should it be preferred to prescribe capsules, then the inital mixture of the selected active ingredient and diluent, as is used for the preparation of the tablet, is filled directly into a suitably sized and shaped gelatin capsule. While it is preferable to utilize a diluent, this is not a critical necessity and the active material may be filled directly into the capsules. The individual unit dosage range for the capsule is from 200 to 600 mg. of active ingredient per capsule.

When it is preferred to administer granules, then the first granulation mix of the diluent and the selected active ingredient as is prepared for the tablet, is utilized. Care should be used in the choice of the diluent, which is dependent upon the nature of the final product. Thus, if a completely soluble granule is desired then a soluble diluent is used, as for example, mannitol, sucrose, glucose or lactose, but if an insoluble preparation is desired, as when a preparation characteristic of the pharmaceutical class of suspensions is desired, then an insoluble diluent, such as starch or the pharmaceutical inert insoluble salts would be used. Suitable flavoring and coloring may be added to the granules, if desired. The average particle size of the granules is from a number 4 mesh to a number 12 mesh size, which is obtained by passing the moistened mass through an appropriate sized sieve and air-drying the particles. A preferred unit dose of the granules is one teaspoonful, which, dependent upon the particle size and weight of the diluent, may range in weight from 2 gm. to 5 gm. However, irrespective of the total weight of the unit dosage, the range in concentration of the active ingredient per unit dose is from 200 to 600 mg.

When a powder is preferred, then the active material is mixed with a suitable diluent as for the preparation of the tablet. The mixture is ground to a particle size of number 60 mesh or finer, using a Fitzpatrick Commutator and dispensed in unit dosage form, each unit weighing from 2 to 5 gm., depending upon the amount and character of the diluent selected. The unit dosage of the active ingredient, however, remains constant, within the range of 200 to 600 mg.

*Example 8*

When it is desired to obtain an antacid effect, then magnesium aluminum hydroxy digluconate, magnesium aluminum hydroxy diglucuronate, magnesium aluminum hydroxy digalacturonate, calcium aluminum hydroxy digluconate, calcium aluminum hydroxy diglucuronate and calcium aluminum hydroxy digalacturonate may be administered either as liquid or solid unit dosage form, such as those described in Example 7. The particular choice of specific pharamcetuical preparation to be utilized depends upon the individual patient and physician preference, since all of these will act at about the same time and with the same degree of effectiveness. The range in concentration of selected active ingredient per unit dose is from 200 to 600 mg. of the respective active compound with a preferred dosage concentration of 400 mg. per unit dose. Immediately after administration of the chosen dosage form, there is an abrupt and rapid neutralization of excess acid so that 1 gm. of the active compound neutralizes 60 ml. of tenth-normal hydrochloric acid. The frequency at which the unit dosage is administered ranges from 1 to 10 times daily, depending upon the individual patient needs.

*Example 9*

When it is desired to utilize magnesium aluminum hydroxy digluconate, magnesium aluminum hydroxy diglucuronate, magnesium aluminum hydroxy digalacturonate, calcium aluminum hydroxy digluconate, calcium aluminum hydroxy diglucuronate, and calcium aluminum hydroxy digalacturonate, as an anti-perspirant-deodorant, then a liquid or ointment topical dosage form is preferred. When a liquid preparation is preferred for application to the various parts of the body wherein it is desired to inhibit the secretion of perspiration, then a concentration of from 5 to 15 percent of the active compound, dissolved in an aqueous or hydroalcoholic vehicle, is preferred. A 10 percent concentration of the active ingredient is an optimal concentration.

A method of preparing such a solution is to dissolve 100 gm. of the selected active compound, as for example, magnesium aluminum hydroxy digluconate, magnesium aluminum hydroxy diglucuronate, magnesium aluminum hydroxy digalacturonate, calcium aluminum hydroxy digluconate, calcium aluminum hydroxy diglucuronate and calcium aluminum hydroxy digalacturonate, in 900 cc. of distilled water, to which is added a suitable antibacterial substance, as for example, 2 percent chlorbutanol or 3 percent parabens or 1 percent hexachlorophene. The solution is then brought to proper volume with either distilled water, ethanol or isopropanol. The solution is then filtered and filled into suitable containers for dispensing, should it be desired to utilize a "roll-on" type of dispenser, then the solution may be used directly, or a viscosity-increasing substance, such as carboxymethylcellulose or polyvinylpyrrolidone, may be added, in concentration of from one-half to one percent, prior to adjusting to final volume. When an aerosol-type dispenser is to be considered, then the aqueous preparation may be utilized directly.

Topical application of magnesium aluminum hydroxy digluconate, magnesium aluminum hydroxy diglucuronate, magnesium aluminum hydroxy digalacturonate, calcium aluminum hydroxy digluconate, calcium aluminum hydroxy diglucuronate, and calcium aluminum hydroxy digalacuronate, in the form of a cream or ointment may be accomplished by the use of a suitable, pharmaceutically acceptable vehicle, such as rosewater ointment, hydrophilic ointment base and cold cream, depending upon the specific needs. The range in concentration of active ingredient in the ointment vehicle is from 5 percent to 15 percent, with a concentration of 10 percent being an optimal concentration. In preparing such preparations, the solid active material is levigated with the calculated quantity of vehicle, until a uniform distribution is achieved. If desired, the active ingredient may be first dissolved in a small quantity of water which is then incorporated into the ointment base by levigation. Should it be necessary to include an additional quantity of a dispersing agent, then from 0.5 to 2 percent of an nonionic emulsifying agent, such as the fatty acid esters of sugar alcohols which are known as the "Tweens" or the "Spans" may be used. When a completely non-aqueous and non-oily vehicle is desired, then either propylene glycol, polyoxyethylene glycol, glycerin and glycerin-gelatin mixtures may be utilized.

In the presence of certain conditions it may be desirable to utilize a dusting powder anti-perspirant, rather than a liquid or cream preparation. Such conditions may arise in the presence of fungal conditions of the extremities or the scalp. In these instances it is necessary to mix the active ingredient with a neutral, pharmaceutically acceptable carrier, such as starch, kaolin, bentonite or talcum, so that the concentration of active ingredient is between .5 and 15 percent with an optimal concentration of 10 percent. Thorough and uniform mixing of the active ingredient must be accomplished and the particle size of such preparations should be at least that of a number 100 mesh. A shaker-top dispensing unit is necessary for such usage, although an air-insufflator may be used. In all of these preparations suitable coloring and perfume additives may be incorporated when desired.

*Example 10*

In order to achieve an inhibition of perspiration, the active ingredient in the form of a preparation as described in Example 9 above, is applied to the particular body areas where anti-perspirant control is indicated. While under ordinary conditions of use an application once daily is sufficient, a small percentage of the population will require more frequent usage, while others may require a less frequent usage. A prompt inhibition of perspiration will be observed immediately after application and there is no discoloration of the skin or is there staining of the clothing.

*Example 11*

When it is desired to deproteinate a food substance, particularly those having a high aqueous concentration, as for example, beer, then a small amount such as from 0.005 to 0.2 percent of magnesium aluminum hydroxy digluconate, magnesium aluminum hydroxy diglucuronate, magnesium aluminum hydroxy digalacturonate, calcium aluminum hydroxy digluconate, calcium aluminum hydroxy diglucuronate and calcium aluminum hydroxy digalacturonate, is added. The addition of the active ingredient immediately renders the protein insoluble and this is evidenced by a clouding or a precipitation depending upon the amount of protein present, such may then be clarified either by filtration, sedimentation or centrifugation. An advantage of this technique is that the entire process is conducted at low temperatures, thereby retaining the original gaseous content of the fluid. Another advantage of this process results in the retention of orignal taste and flavors with only the protein being removed.

When it is desired to fix the protein of animal skin as in a tanning process of leather manufacture, then magnesium aluminum hydroxy digluconate, magnesium aluminum hydroxy diglucuronate, magnesium aluminum digalacturonate, calcium aluminum hydroxy digluconate, calcium aluminum hydroxy diglucuronate and calcium aluminum hydroxy digalacturonate, may be either utilized in a dry form as a powder, by rubbing the active ingredient directly into the surface of the skin or in admixture with other compounds such as tannins. Liquid preparations may also be utilized and the skins dipped into such solutions of the respective substances. The range in concentration of active ingredients of such solutions when used as a liquid preparation for the manufacture of leathers, is from 1 to 5 percent.

*Example 12*

When it is desired to achieve an antacid and anti-peptic effect in the management of certain diseases of the gastrointestinal tract, then a preparation as described in Example 7, containing an active ingredient such as magnesium aluminum hydroxy digluconate, magnesium aluminum hydroxy diglucuronate, magnesium aluminum hydroxy digalacturonate, calcium aluminum hydroxy digluconate, calcium aluminum hydroxy diglucuronate and calcium aluminum hydroxy digalacturonate, is administered. The compounds are administered from 1 to 10 times daily, depending upon the individual patient needs and have the advantage of not causing a constipating action as well as being non-toxic to the organs. The enzyme-pepsin is promptly inhibited after the ingestion of the compound and this effect persists for at least two hours. A prompt antacid effect occurs concomitantly, which serves to neutralize the secreted excess acid. The combination of antacid and anti-peptic activity proceeds without interfering with digestion and serves to neutralize the corrosive action of these substances on the tissues.

What is claimed is:

1. A compound having the formula XALOH2R, wherein X is an ion selected from the group consisting of calcium and magnesium and R is an organic acid radical selected from the group consisting of gluconic acid, glucuronic acid and galacturonic acid.
2. Magnesium aluminum hydroxy digluconate.
3. Magnesium aluminum hydroxy diglucuronate.
4. Magnesium aluminum hydroxy digalacturonate.
5. Calcium aluminum hydroxy digluconate.
6. Calcium aluminum hydroxy diglucuronate.
7. Calcium aluminum hydroxy digalacturonate.
8. A method of preparing the compound of claim 1 comprising the steps of reacting an acid compound selected from the group consisting of gluconic acid, glucuronic acid and galacturonic acid with aluminum hydroxide in aqueous medium with heating and treating the resultant intermediate formed with a basic hydroxide compound selected from the group consisting of calcium oxide, calcium hydroxide, calcium carbonate, magnesium hydroxide, magnesium oxide and magnesium carbonate in aqueous medium with heating and recovering the formed compound XALOH2R, wherein X is an ion selected from the group consisting of magnesium and calcium and R is an acid radical selected from the group consisting of galacturonic acid, gluconic acid and glucuronic acid.
9. The method of claim 8 wherein the said acid compound is gluconic acid and the said basic hydroxide compound is magnesium hydroxide and the formed compound is magnesium aluminum hydroxy digluconate.
10. The method of claim 8 wherein the said acid compound is glucuronic acid and the said basic hydroxide compound is magnesium hydroxide and the formed compound is magnesium aluminum hydroxy diglucuronate.
11. The method of claim 8 wherein the said acid compound is galacturonic acid and the said basic hydroxide compound is magnesium hydroxide and the formed compound is magnesium aluminum hydroxy digalacturonate.
12. The method of claim 8 wherein the said acid compound is gluconic acid and the basic hydroxide is calcium hydroxide and the formed compound is calcium aluminum hydroxy digluconate.
13. The method of claim 8 wherein the said acid compound is glucuronic acid and the said basic hydroxide compound is calcium hydroxide and the formed compound is calcium aluminum hydroxy diglucuronate.
14. The method of claim 8 wherein the said acid compound is galacturonic acid and the said basic hydroxide compound is calcium hydroxide and the formed compound is calcium aluminum hydroxy digalacturonate.

References Cited

UNITED STATES PATENTS 2,338,534   1/1944   Pasternack et al. _____ 260—345.7
2,681,352   6/1954   Hach et al. _____ 260—345.7

WALTER A. MODANCE, *Primary Examiner.*

JOHN M. FORD, *Assistant Examiner.*